US005337566A

United States Patent [19]

Lomastro et al.

[11] Patent Number: 5,337,566

[45] Date of Patent: Aug. 16, 1994

[54] POWDER ACTUATED COMPRESSION TOOL

[75] Inventors: Joseph A. Lomastro, Pawtucket, R.I.; Urs F. Nager, Hudson, N.H.

[73] Assignee: Burndy Corporation, Norwalk, Conn.

[21] Appl. No.: 33,003

[22] Filed: Mar. 18, 1993

[51] Int. Cl.[5] ............ G06F 15/46

[52] U.S. Cl. ............ 60/632; 227/10

[58] Field of Search ............ 60/632, 635, 638; 227/9, 10; 72/453.16, 412, 21

[56] References Cited

U.S. PATENT DOCUMENTS

| | | | |
|---|---|---|---|
| Re. 33,098 | 10/1989 | Center | 60/635 |
| 2,455,826 | 12/1948 | Temple | 227/10 |
| 2,968,043 | 1/1961 | Demler | 72/430 |
| 3,251,216 | 5/1966 | Broske | 227/10 |
| 3,292,363 | 12/1966 | Wahl | 60/632 |
| 3,296,792 | 1/1967 | Hedberg et al. | 60/632 |
| 4,136,549 | 1/1979 | Lytle et al. | 72/453.16 |
| 4,282,714 | 8/1981 | Fiocchi | 60/632 |
| 4,667,502 | 5/1987 | Bush et al. | 72/453.16 |
| 4,712,379 | 12/1987 | Adams et al. | 60/632 |
| 4,722,189 | 2/1988 | Center | 60/632 |
| 4,877,171 | 10/1989 | Almeras | 227/10 |
| 4,942,757 | 7/1990 | Pecora | 72/453.16 |
| 4,945,730 | 8/1990 | Laney | 60/635 |
| 5,113,679 | 5/1992 | Ferraro et al. | 72/21 |
| 5,114,064 | 5/1992 | Jochum et al. | 227/10 |
| 5,119,634 | 6/1992 | Berry et al. | 60/632 |
| 5,152,162 | 10/1992 | Ferraro et al. | 72/21 |
| 5,193,379 | 3/1993 | Ferraro | 72/412 |
| 5,195,042 | 3/1993 | Ferraro et al. | 72/10 |

OTHER PUBLICATIONS

"Burndy Y35/Y35-2 Hydraulic Hypress" operating, maintenance & instruction manual, Burndy Corporation, Dec. 1967.

*Primary Examiner*—Tony M. Argenbright
*Assistant Examiner*—M. Macy
*Attorney, Agent, or Firm*—Perman & Green

[57] ABSTRACT

A tool for connecting an electrical connector to a conductor includes a drive mechanism and a compression head. The drive mechanism has a housing, a first ram and a firing mechanism to ignite a powder cartridge that moves the first ram relative to the housing. The compression head is adjustably connected to the housing and includes a frame, a second ram movably mounted to the frame and an adaptor adjustably connecting the frame to the housing. The adaptor has an aperture such that the first ram can extend through the adaptor and move the second ram.

19 Claims, 2 Drawing Sheets

POWDER ACTUATED COMPRESSION TOOL

BACKGROUND OF THE INVENTION

1. Field of the Invention

The present invention relates to a tool for connecting an electrical connector to a conductor and, more particularly, to a powder actuated compression tool.

2. Prior Art

U.S. Pat. No. Re. 33,098 discloses an explosively—operated tool for connecting two cables to each other by means of a wedge connector. The tool has a drive mechanism adjustably connected to a base having an anvil. The tool uses a powder cartridge to propel a driving rod towards the anvil. U.S. Pat. No. 2,455,826 discloses an explosively actuated tool with a stationary die threaded into a tool body and a movable die connected to a piston. U.S. Pat. No. 2,968,043 discloses springs used in the firing mechanism of an explosively actuated tool. Other explosively actuated tools are disclosed in U.S. Pat. Nos. 4,945,730; 3,296,762; 4,282,714; 3,292,363; 4,712,379 and 5,119,634. U.S. Pat. No. 5,113,679 discloses a hydraulic crimping tool. U.S. Pat. No. 4,942,757 discloses a hydraulic press with infinite head rotation.

SUMMARY OF THE INVENTION

In accordance with one embodiment of the present invention a tool for connecting an electrical connector to a conductor is provided comprising a drive mechanism and a compression head. The drive mechanism comprises a housing, a first ram movably connected to the housing, and the means for moving the first ram relative to the housing. The compression head is adjustably connected to the housing and comprises a frame and a second ram movably mounted to the frame. The frame is movably connected to the housing with an end of the first ram extending into the frame and contacting an end of the second ram.

In accordance with another embodiment of the present invention, a compression head for an electrical connector compression tool is provided comprising a frame, a ram and an adaptor for adjustably connecting the frame to a housing of a drive mechanism of the compression tool. The ram is movably mounted to the frame. The adaptor is connected to a first end of the frame. The adaptor has a threaded aperture aligned with a rear end of the ram and adapted to threadingly receive a portion of the drive mechanism housing therein.

In accordance with another embodiment of the present invention a compression head for an electrical connector compression tool is provided comprising a frame, a ram movably mounted to the frame, means for mounting compression dies to the frame and ram, means for adjustably connecting the frame to a housing of a drive mechanism of the compression tool and means for positioning a drive mechanism of the compression tool at a firing position.

BRIEF DESCRIPTION OF THE DRAWINGS

The foregoing aspects and other features of the invention are explained in the following description, taken in connection with the accompanying drawings, wherein.

DETAILED DESCRIPTION OF THE INVENTION

Figure 1:
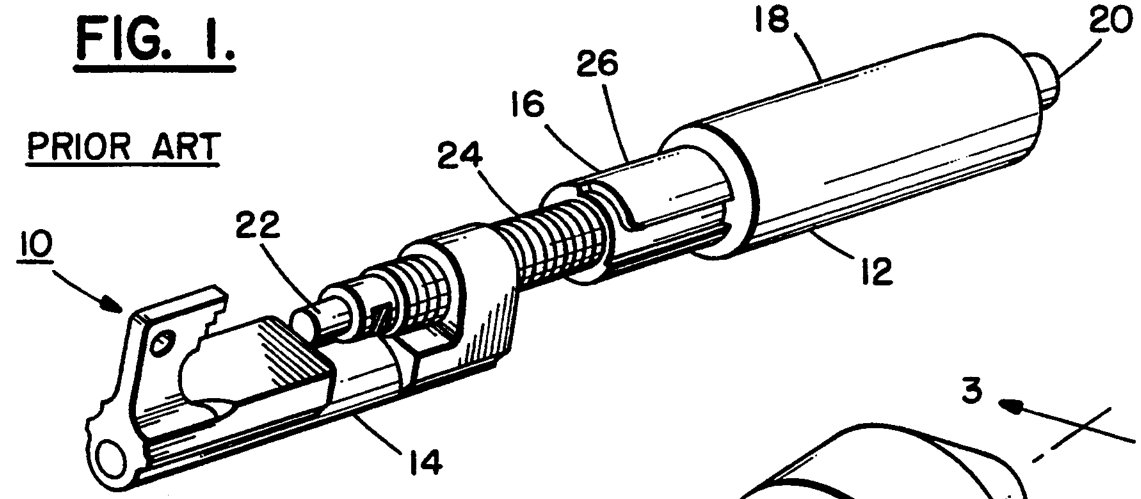
FIG. 1. PRIOR ART
FIG. 1 is a perspective view of a powder actuated compression tool known in the prior art.
Figure 4:
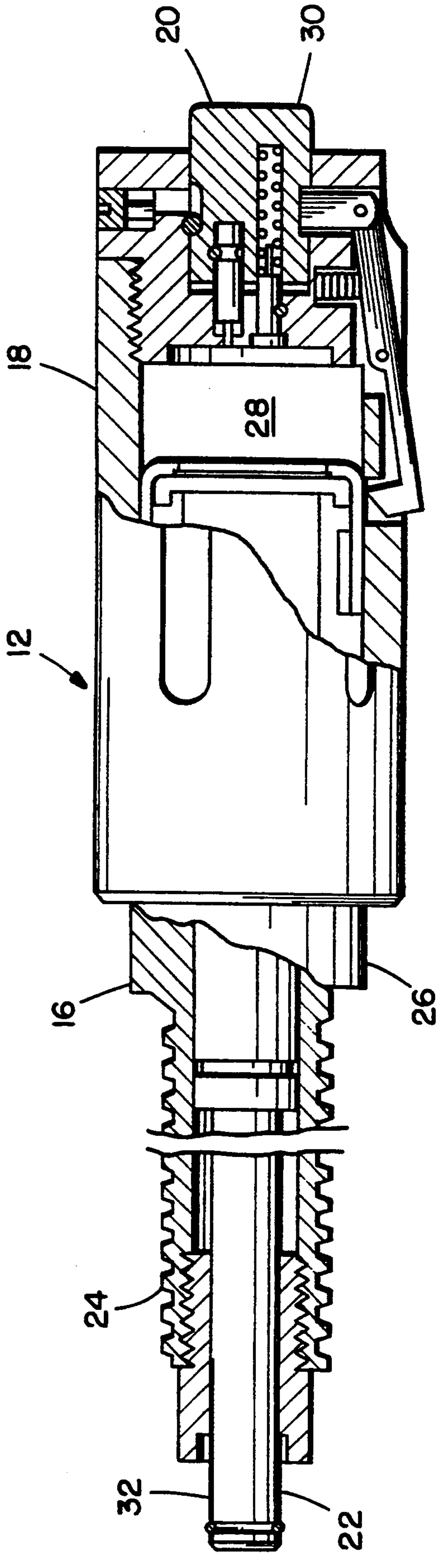
FIG. 4. PRIOR ART
FIG. 4 is a partial cross-sectional view of the drive mechanism of the prior art tool shown in FIG. 1.

Referring to FIG. 1, there is shown a powder activated connecting tool 10 known in the prior art. The tool 10 is used to connect a wedge-type connector (not shown) to two electrical cables (not shown). A full description of the tool 10 can be found in U.S. Pat. Nos. 4,945,730 and Re. 33,098 which are hereby incorporated by reference in their entirety. The tool 10 generally comprises a drive mechanism 12 and an anvil head 14. Referring also to FIG. 4, the drive mechanism 12 generally comprises a first frame 16, a cartridge housing 18, a firing mechanism 20, and a first ram 22. The frame 16 is preferably made of metal and includes a front threaded section 24 and a rear section 26. The cartridge housing 18 is movably mounted on the frame 16 between a breech open position and a breech closed position to allow for loading, unloading and firing of powder cartridges (not shown). FIG. 1 shows the drive mechanism 12 in a breech open position. The cartridge housing 18 has the firing mechanism 20 mounted at its rear end. The firing mechanism 20 is adapted to initiate a powder cartridge (not shown) located in the breech chamber 28 when the striker 30 is hit by a hammer (not shown). Movably mounted in the frame 16 and the cartridge housing 18 is the ram 22. A rear end of the ram 22 is adapted to be positioned inside a loaded cartridge and press against a piston of the cartridge. A front end 32 of the ram 22 extends out of a front face of the frame 16.

Figure 2:
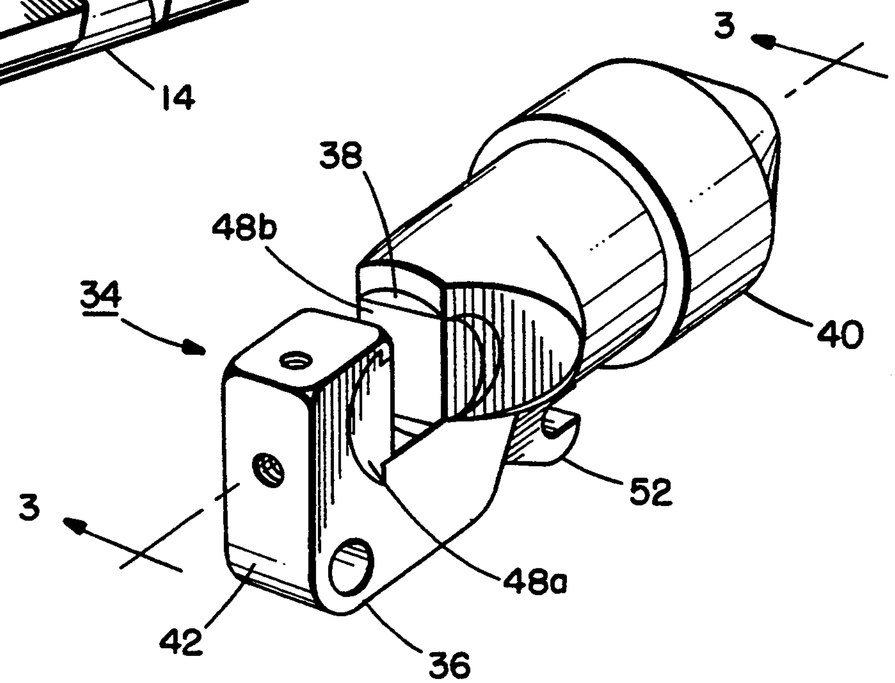
FIG. 2 is a perspective view of a compression head incorporating features of the present invention.
Figure 3:
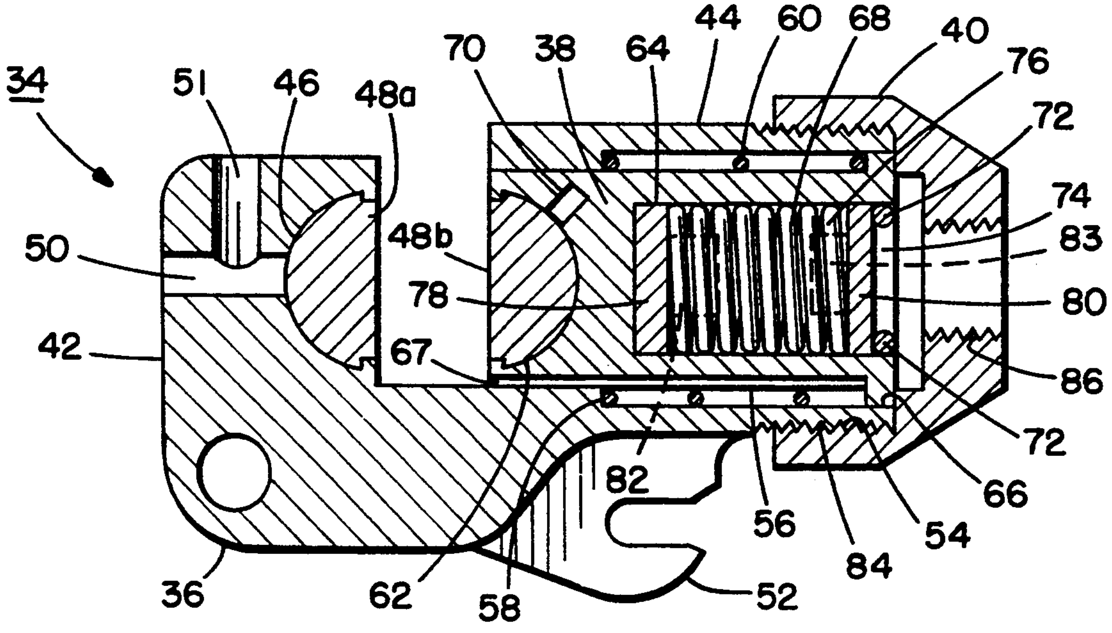
FIG. 3 is a cross-sectional view of the head shown in FIG. 2 taken along line 3—3.

Referring now also to FIGS. 2 and 3, the compression head 34 will be described. The head 34 is adapted for use with the prior art drive mechanism 12. Thus, a new type of compression or crimping tool can be provided. The anvil head 14 of the old tool 10 is merely unscrewed from the threaded section 24 and the compression head 34 is then attached to the threaded section 24. The head 34 generally comprises a second frame 36, a second ram 38, and an adaptor 40. The frame 36 is preferably made of metal and includes a top 42 and a neck 44. The top 42 has a cavity 46 for removably receiving a compression die **48*a*. Channels 50, 51 hold a suitable spring and plunger (not shown) to help bias the die 48*a* and keep it in the cavity 46. The neck 44 includes a hot stick mount 52, a threaded section 54, and a center aperture 56 for receiving the ram 38. The center aperture 56 has a ledge 58 for supporting one end of return spring 60**.

The ram 38 is preferably made of metal and includes a front end with a cavity 62 for removably receiving a compression or crimping die **48*b*, and a rear end with an aperture into an internal cavity 64 of the ram 38 and a peripheral rim 66. The rim 66 is provided to support an end of the return spring 60. The ram 38 also has a keyway 67 and the frame 36 has a key to prevent the ram 38 from inadvertently axially rotating in the center aperture 56. The internal cavity 64 is adapted to hold a loading/return spring assembly 68. The ram 38** is adapted to longitudinally move in the center aperture 56 of the frame 36. A suitable spring and plunger (not shown) is contained in hole 70 to help bias the die 48*b* and keep it in the cavity 62. The rear end of the ram 38 also has holes for mounting pins 72. The pins 72 are located on opposite sides of the center axis of the cavity 64 with a space 74 between the two pins 72 to allow the front end 32 of the ram 22 to project between.

The loading/return spring assembly 68 generally comprises a coil spring 76, a front ram pusher 78 and a rear ram pusher 80. The spring 76 is sandwiched between the two pushers 78, 80 in the cavity 64. The pins 72 keep the assembly 68 inside the cavity 64. The pushers have abutment shafts 82, 83 that are located in the center area of the coil spring 76 and face each other. The shafts 82, 83 are spaced from each other in the non-loading position shown in FIG. 3, but contact each other in a loading ready-to-fire position as further described below.

The adaptor 40 is preferably made of metal and includes a center aperture with a front threaded section 84 and a rear threaded section 86. The front threaded section 84 is connected to the threaded section 54 of the head's frame 36. The rear threaded section 86 is suitably sized and shaped to be threadingly mounted on the threaded section 24 of the drive mechanism 12. As seen in FIG. 3, the adaptor 40 contains the ram 38 inside the frame 36 with the spring 60 biasing the ram 38 against the adaptor 40 in the nonloaded position. The spring 76 biases the rear pusher 80 against the pins 72 in the nonloaded position.

The head 34 is generally adapted to compress or crimp a connector (not shown) to a conductor (not shown) similar to the head of the Y35/Y35-2 Hydraulic HYPRESS manufactured by Burndy Corporation of Norwalk, Connecticut (HYPRESS is a registered trademark of Burndy Corporation). A similar head is described in U.S. Pat. No. 4,942,757 which is hereby incorporated by reference in its entirety. A connector and conductor are inserted between the dies 48*a*, 48*b* and the ram 38 is moved forward to compress or crimp the connector onto the conductor. However, unlike the hydraulic drive system of the HYPRESS, the head 34 of the present invention is adapted for use with the powder actuated drive mechanism 12.

If it is desired to use the head 34, a user of the tool 10 can merely remove the anvil head 14 from the drive mechanism 12 by unscrewing the anvil head 14 from the threaded section 24. The user can then attach the head 34 to the drive mechanism 12 by screwing the threaded section 24 of the drive mechanism 12 into the threaded section 86 of the adaptor 40. In a preferred method, with a cartridge located in the drive mechanism 12 and the housing 18 of the drive mechanism in a forward breech locked position, the drive mechanism 12 is screwed into the adaptor 40 with the front face of the ram 22 contacting the rear face of the rear pusher 80. The ram 38 is thus moved forward relative to the frame 36 with the spring 60 being compressed until the two dies 48*a* and 48*b* sandwich the connector between them. The ram 38 is moved relatively forward because the screwing action of the adaptor 40 on the threaded section 24 actually pulls the adaptor 40 and head frame 36 rearward on the drive mechanism 12. After the connector is sandwiched between the two dies 48*a*, 48*b*, the drive mechanism is continued to be screwed into the adaptor 40 with the spring 76 being compressed. In this fashion, the spring 76 biases the rear pusher 80 against the ram 22 of the drive mechanism 12 such that the rear end of the ram 22 pushes against a piston in the cartridge to enable the cartridge to be fired. The movement of the piston in the cartridge by a drive rod to enable firing is more fully described in U.S. Pat. No. Re. 33,098. The user then merely strikes the striker 30 with a hammer (not shown) to fire the cartridge. When the cartridge is fired, expanding gases from burning powder in the cartridge drives the first ram 22 of the drive mechanism 12 forward. Because the front end 32 of the ram 22 is adjacent the rear pusher 80, the rear pusher 80 is driven forward. The rear pusher 80 contacts and pushes front pusher 78 as the abutment shafts 82, 83 contact each other. This pushes the second ram 38 and die 48*b* forward to quickly compress or crimp the connector and conductor between the two dies 48*a*, 48*b*. After the crimp is made, the user then merely unscrews the drive mechanism 12. The return spring 60 returns the ram 38 to its rearward position in the frame 36 and the spring 76 returns the rear pusher 80 back to its position against the pins 72. The spent or used cartridge can be removed, a new cartridge inserted, and the tool can be used again.

As noted above, the dies 48*a*, 48*b* are removably mounted to the head 34. Therefore, by use of different dies, different sizes and types of connectors can be crimped and different types of crimp patterns can be provided. This is a great improvement in versatility over the single type of connector that the prior art tool 10 could be used on. Although the head 34 can be sold together with its own drive mechanism, the head 34 can also be sold separately to users that already own the prior art tool 10. In alternate embodiments, the head 34 could have additional or alternative means of attaching the head to the drive mechanism 12 or, the head 34 could be adapted for use with a different configuration of powder actuated drive mechanism. The head 34, rather than having removable dies 48*a*, 48*b*, could alternatively have a multi-size dieless ram face and anvil face similar to U.S. Pat. No. 5,193,379.

Figure 5:
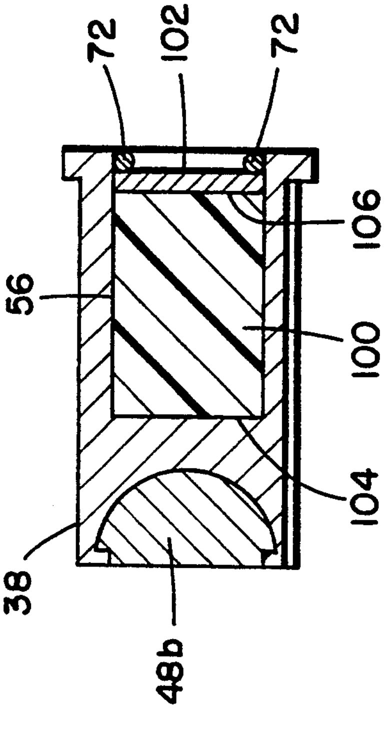
FIG. 5 is a cross-sectional view of a ram having an alternate ram loading and biasing system.

Referring also to FIG. 5, a ram 38 is shown with die 48*b*, and pins 72. However, in this embodiment the loading/return spring assembly 68 has been replaced by a block 100 and loading plate 102. The block 100 is preferably comprised of a resilient slightly deformable polymer material, such as polyethylene. A front end 104 of the block 100 contacts the ram 38 inside the cavity 56 and is adapted to push the ram 38. The loading plate 102 is preferably made of metal and is located against the rear end 106 of the block 100. The block 100 and loading plate 102 are retained in the cavity 56 by the pins 72. Because the block is made of a resilient slightly deformable polymer material and it is fully contained in the cavity 56, it can function similar to the spring 76 to bias the ram 22 into the cartridge in the drive mechanism. However, unlike the spring 76, the block 100 is able to transfer forces from the loading plate without the need for the interacting pushers 78, 80. The loading plate 102 is provided to distribute the force from the front end 32 of the ram 22 about the entire rear face 106 and thereby prevent the ram 22 from penetrating through the block 100. The block 100, similar to the spring 76, insures that the rear end of the ram 22 is properly positioned even if the head 34 or drive mechanism 12 inadvertently slightly unscrew before firing of the drive mechanism 12 and to insure that the connector is well clamped between the dies 48*a*, 48*b* even if inadvertent slight unscrewing occurs prior to firing.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A tool for connecting an electrical connector to a conductor, the tool comprising:

a drive mechanism comprising a first frame, a first ram movably mounted to the first frame, and means for moving the first ram relative to the first frame; and a compression head connected to the first frame, the compression head comprising a second frame and a second ram movably mounted to the second frame, the second frame being adjustably connected to the first frame with an end of the first ram extending into the second frame and contacting an end of the second ram.

2. A tool as in claim 1 wherein the second frame includes a first member and an adaptor connected to the first member.

3. A tool as in claim 2 wherein the first frame has a threaded section that extends through a threaded hole in the adaptor.

4. A tool as in claim 1 wherein the compression head includes means for mounting compression dies to opposing surfaces of the second frame and the second ram.

5. A tool as in claim 1 wherein the second frame includes a hot stick connection section.

6. A tool as in claim 1 wherein the compression head further comprises means for positioning the first ram at a firing position.

7. A tool as in claim 6 wherein the means for positioning includes a spring connected at a rear end of the second ram.

8. A tool as in claim 6 wherein the means for positioning includes a block of resilient slightly deformable material located in a cavity at a rear end of the second ram.

9. A compression head for an electrical connector compression tool having a cartridge operated drive mechanism, the drive mechanism having a drive mechanism frame, a drive mechanism ram, and a cartridge firing mechanism, the drive mechanism frame having a front threaded section, the compression head comprising:

a compression head frame a compression head ram movably mounted to the compression head frame; and an adaptor for adjustably connecting the compression head frame to the drive mechanism frame, the adaptor being connected to a first end of the compression head frame and having a threaded aperture aligned with a rear end of the compression head ram and adapted to threadingly receive a portion of the front threaded section of the drive mechanism frame therein.

10. A compression head as in claim 9 wherein the compression head frame includes means for connecting a hot stick to the compression head frame.

11. A compression head as in claim 9 further comprising means for removably connecting compression dies to the compression head frame and compression head ram.

12. A compression head as in claim 11 further comprising means for biasingly sandwiching the electrical connector between the dies.

13. A compression head as in claim 12 wherein the means for biasingly sandwiching includes a coil spring located in the compression head ram with a pusher at a rear face of the compression head ram adapted to be contacted by the drive mechanism.

14. A compression head as in claim 9 further comprising means for positioning the drive mechanism at a firing position.

15. A compression head as in claim 12 wherein the means for biasingly sandwiching includes a block of resilient slightly deformable material located in a cavity at the rear end of the compression head ram.

16. A compression head for an electrical connector compression tool, the compression head comprising:

a frame;

a ram movably mounted to the frame;

means for mounting compression dies to the frame and ram;

means for adjustably connecting the frame to a housing of a drive mechanism of the compression tool;

means for positioning a drive mechanism of the compression tool at a firing position; and a return spring located between portions of the ram and the frame.

17. A compression head as in claim 16 wherein the means for adjustably connecting comprises an adaptor connected to a rear end of the frame, the adaptor having a threaded aperture adapted to threadingly receive a portion of the drive mechanism housing.

18. A compression head as in claim 16 wherein the means for positioning the drive mechanism at a firing position includes a coil spring located in the ram and a pusher at a rear end of the ram.

19. A compression head as in claim 16 wherein the means for positioning the drive mechanism at a firing position includes a block of resilient polymer material.

* * * * *